United States Patent
Harada et al.

(10) Patent No.: US 11,821,353 B2
(45) Date of Patent: Nov. 21, 2023

(54) ENGINE AND METHOD OF MANUFACTURING THE SAME

(71) Applicant: Mazda Motor Corporation, Hiroshima (JP)

(72) Inventors: Yuji Harada, Aki-gun (JP); Kenji Uchida, Aki-gun (JP); Ryohei Ono, Aki-gun (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 17/987,440

(22) Filed: Nov. 15, 2022

(65) Prior Publication Data

US 2023/0184159 A1 Jun. 15, 2023

(30) Foreign Application Priority Data

Dec. 6, 2021 (JP) ................... 2021-198059

(51) Int. Cl.
*F02B 19/12* (2006.01)
*F02B 19/18* (2006.01)
*F02B 19/10* (2006.01)

(52) U.S. Cl.
CPC .......... *F02B 19/12* (2013.01); *F02B 19/1014* (2013.01); *F02B 19/18* (2013.01)

(58) Field of Classification Search
CPC ...... F02B 19/1014; F02B 19/12; F02B 19/16; F02B 19/18
See application file for complete search history.

(56) References Cited

U.S. PATENT DOCUMENTS

| | | | | |
|---|---|---|---|---|
| 2,287,637 A | * | 6/1942 | Otto, I ................ | F02B 19/1004 123/286 |
| 3,980,057 A | * | 9/1976 | Sanda .................... | F02B 19/12 123/270 |
| 4,180,044 A | * | 12/1979 | Sanda .................... | F02B 19/12 123/260 |
| 4,250,852 A | * | 2/1981 | Abulkasim ogly Kerimov .......... | F02B 19/108 123/260 |

(Continued)

FOREIGN PATENT DOCUMENTS

JP 2018066369 A 4/2018
JP 2021113549 A 8/2021

*Primary Examiner* — Logan M Kraft
*Assistant Examiner* — Anthony L Bacon
(74) *Attorney, Agent, or Firm* — Alleman Hall Creasman & Tuttle LLP (57) ABSTRACT

To meet both a request to improve the thermal efficiency in medium load operation of an engine and a request to suppress knocking in high load operation of the engine, the engine includes a main combustion chamber including a cylinder block, a cylinder head, and a piston; a pre-chamber having a plurality of injection holes that open into the main combustion chamber; and a spark plug that ignites an air-fuel mixture in the pre-chamber. A compression ratio of the main combustion chamber is not less than 14 and not more than 24, an aperture ratio, which is the ratio of a total cross-sectional area of the plurality of injection holes to a volume of the pre-chamber, is not less than 0.0078 $mm^{-1}$ and not more than 0.0145 $mm^{-1}$, and the volume of the pre-chamber 15 is not less than 0.0430 $cm^3$ and not more than 0.5631 $cm^3$.

20 Claims, 7 Drawing Sheets

(56) References Cited

U.S. PATENT DOCUMENTS

| | | | | |
|---|---|---|---|---|
| 5,603,298 A | * | 2/1997 | Kawamura | F02B 19/02 |
| | | | | 123/292 |
| 10,180,124 B1 | * | 1/2019 | Gupta | F02P 23/04 |
| 2017/0138251 A1 | * | 5/2017 | Watanabe | F02B 19/1019 |
| 2017/0314456 A1 | * | 11/2017 | Blaxill | F02B 19/1028 |
| 2019/0078498 A1 | * | 3/2019 | Bedogni | F02B 19/1019 |
| 2020/0080466 A1 | * | 3/2020 | Anderson | F02B 19/12 |
| 2020/0332705 A1 | * | 10/2020 | Han | F02B 19/08 |
| 2021/0222643 A1 | | 7/2021 | Nagatsu et al. | |
| 2021/0340899 A1 | * | 11/2021 | Hoag | F02B 19/18 |

* cited by examiner

ENGINE AND METHOD OF MANUFACTURING THE SAME

TECHNICAL FIELD

The present disclosure relates to an engine and a method of manufacturing the engine.

BACKGROUND ART

Pre-chamber ignition is known as a technique for improving the thermal efficiency of a reciprocating engine. In this technique, a small pre-chamber is provided separately from a main combustion chamber including a cylinder block, a cylinder head, and a piston, and an air-fuel mixture is ignited in the pre-chamber so that a flame is ejected as a jet blast through the injection holes of the pre-chamber into the main combustion chamber. This technique is attracting attention as the thermal efficiency is improved because the air-fuel mixture in the main combustion chamber burns faster than in normal flame propagation. The tip of the spark plug is covered with a cap-shaped partition wall, which separates the tip from the main combustion chamber, to form the pre-chamber and a plurality of injection holes are formed in the partition wall.

Pre-chamber ignition is classified into an active type and a passive type. The active type has an injector in the pre-chamber and forms an air-fuel mixture required for ignition in the pre-chamber. The passive type does not have an injector in the pre-chamber and guides the air-fuel mixture formed in the main combustion chamber in the compression stroke to the vicinity of the spark plug through the injection holes. JP2018-66369A illustrates an example of active type pre-chamber ignition and JP2021-113549A illustrates an example of passive type pre-chamber ignition.

SUMMARY OF THE INVENTION

Problem to be Solved by the Invention

In the case of the passive type, when the volume of the pre-chamber and the diameter and the number of injection holes are determined, the jet potential of the flame that is ejected from the pre-chamber to the main combustion chamber, that is, a maximum value RETmax of the energy transfer ratio from the pre-chamber to the main combustion chamber is uniquely determined. Accordingly, it is difficult to meet both a request to improve the thermal efficiency in a medium load operation of an engine and a request to suppress knocking in a high load operation of the engine at the same time.

For example, exhaust gas recirculation (EGR) is performed to reduce NOx emissions and improve fuel efficiency in the medium load operation. Since the EGR gas flows into the pre-chamber, a misfire is likely to occur after ignition. The specifications of the pre-chamber may be determined with the object of causing the air-fuel mixture to easily flow into the pre-chamber and increasing the jet potential to meet a request to prevent a misfire and improve the thermal efficiency in the medium load operation. In that case, however, a highly concentrated air-fuel mixture enters the pre-chamber in the high load operation, so the jet potential becomes excessively large and knocking occurs easily. In contrast, when the specifications of the pre-chamber are determined with the object of suppressing the jet potential to suppress knocking at high load, the above request in the medium load operation cannot be met.

An object of the present disclosure is to meet both a request to improve the thermal efficiency in the medium load operation of an engine and a request to suppress knocking in the high load operation of the engine.

Means for Solving the Problem

As a result of various studies on pre-chamber ignition, the inventors have found that both a request in a medium load operation and a request in a high load operation can be met in this ignition combustion method.

An engine disclosed herein includes a main combustion chamber including a cylinder block, a cylinder head, and a piston; a pre-chamber having a plurality of injection holes that open into the main combustion chamber; and a spark plug that ignites an air-fuel mixture in the pre-chamber. A compression ratio $\varepsilon$ of the main combustion chamber is not less than 14 and not more than 24, an aperture ratio $\beta$ is not less than 0.0078 mm$^{-1}$ and not more than 0.0145 mm$^{-1}$ where the aperture ratio $\beta$ is a ratio of a total cross-sectional area St of the plurality of injection holes to a volume V of the pre-chamber, and the volume V of the pre-chamber is not less than 0.12 cm$^3$ and not more than 0.328 cm$^3$.

The compression ratio $\varepsilon$ can be determined based on requests for thermal efficiency and ignition timing. On the other hand, when the compression ratio $\varepsilon$ is small, the filling degree of air or the air-fuel mixture from the main combustion chamber to the pre-chamber is small. Accordingly, the compression ratio $\varepsilon$ is not less than 14 with the object of obtaining, in the pre-chamber, the air-fuel mixture that is surely ignited by firing in the medium load EGR operation. However, since an increase in the compression ratio $\varepsilon$ easily causes knocking at a high load and high rotation, the upper limit is 24.

The aperture ratio $\beta$ is not less than 0.0078 mm$^{-1}$ and not more than 0.0145 mm$^{-1}$ with the object of ensuring ignition in the high load and high rotation operation and improving the thermal efficiency in the medium load exhaust gas recirculation (EGR) operation.

First, one problem in the high load and high rotation operation is the exchange of gas in the pre-chamber. That is, since the air-fuel mixture passes through the narrow injection holes through which the main combustion chamber communicates with the pre-chamber in pre-chamber ignition, a problem occurs in the exchange of gas in the pre-chamber when the piston moves fast. Whether air or the air-fuel mixture smoothly passes through the injection holes depends on the aperture ratio $\beta$. Accordingly, the lower limit of the aperture ratio $\beta$ is 0.0078 mm$^{-1}$ so that air or the air-fuel mixture is surely packed in the pre-chamber to ensure ignition in the high load and high rotation operation.

Then, since the upper limit of the aperture ratio $\beta$ is 0.0145 mm$^{-1}$, the jet potential can be prevented from becoming excessively small in the medium load EGR operation. That is, the thermal efficiency can be easily improved by obtaining a desired jet potential.

Next, the volume V of the pre-chamber, which affects the size of the jet potential, will be described. Since this volume V is not less than 0.12 cm$^3$, a relatively large jet potential can be obtained even in the medium load. Accordingly, the thermal efficiency can be advantageously improved. On the other hand, since the upper limit of the volume V is 0.328 cm$^3$, the jet potential can be prevented from becoming excessively large at high load and high rotation, thereby advantageously suppressing knocking.

In an embodiment, the compression ratio $\varepsilon$ is not less than 16 and not more than 18. This is more advantageous to fill the pre-chamber with the air-fuel mixture in the medium load EGR operation and to suppress knocking at high load and high rotation.

In an embodiment, the volume V of the pre-chamber is not less than 0.2 cm$^3$ and not more than 0.328 cm$^3$. This can obtain a desired jet potential in the medium load operation and suppress the knock at high load and high rotation with sureness.

In an embodiment, the aperture ratio β is not less than 0.0078 mm$^{-1}$ and not more than 0.011 mm$^{-1}$. This is more advantageous to ensure ignition in the high load and high rotation operation and to improve the thermal efficiency in the medium load EGR operation.

In addition, an engine disclosed herein includes a main combustion chamber including a cylinder block, a cylinder head, and a piston; a pre-chamber having a plurality of injection holes that open into the main combustion chamber; and a spark plug that ignites an air-fuel mixture in the pre-chamber. A compression ratio ε of the main combustion chamber is not less than 14 and not more than 24, an aperture ratio β is not less than 0.0078 mm$^{-1}$ and not more than 0.0145 mm$^{-1}$ where the aperture ratio β is a ratio of a total cross-sectional area St of the plurality of injection holes to a volume V of the pre-chamber, and the volume V of the pre-chamber is expressed by the following equation using the compression ratio ε and the aperture ratio β:

$$V = (1/2.6080) \times \ln(A)$$

where "A" is a/(0.3600×(0.9698×ln(ε)−1.5623)×(0.8494×ln(β)+5.1483)) and "a" is not less than 0.95 and not more than 1.6.

That is, in this engine, the volume V of the pre-chamber depends on the compression ratio ε and the aperture ratio β. Specifically, the volume V becomes smaller as the compression ratio ε is larger or the aperture ratio β is larger. Since knocking occurs more easily at high load and high rotation as the compression ratio ε is larger, the volume V is set to be smaller as the compression ratio ε is larger so as to prevent the jet potential from becoming excessively large. In addition, since the jet potential becomes larger as the aperture ratio β is larger, the volume V is set to be smaller as the aperture ratio β is larger to suppress this.

This engine is advantageous to ensure ignition and suppress knocking in the high load and high rotation operation and to ensure ignition and improve the thermal efficiency in the medium load EGR operation. In particular, the thermal efficiency can be more surely improved by obtaining the desired jet potential in the medium load operation and knocking at high load and high rotation can be more surely suppressed since the volume V depends on the compression ratio ε and the aperture ratio β.

In an embodiment, an injector of each of the engines that injects fuel to form the air-fuel mixture is provided so as to inject the fuel into the main combustion chamber.

A method disclosed herein is a method of manufacturing an engine including a main combustion chamber including a cylinder block, a cylinder head, and a piston, a pre-chamber having a plurality of injection holes that open into the main combustion chamber, and a spark plug that ignites an air-fuel mixture in the pre-chamber. The method includes a step of setting a compression ratio ε of the main combustion chamber, a step of setting an aperture ratio β that is a ratio of a total cross-sectional area St of the plurality of injection holes to a volume V of the pre-chamber, and a step of setting the volume V of the pre-chamber. In the step of setting the aperture ratio β, an upper limit aperture ratio βmax is determined based on the compression ratio ε so that a pressure difference Δβmax obtained by subtracting a pressure in the main combustion chamber from a pressure in the pre-chamber when the pressure in the pre-chamber is maximized under a medium load EGR operation condition of the engine is not less than a predetermined value, a lower limit aperture ratio βmin is determined based on the compression ratio ε so that a pressure difference ΔPig obtained by subtracting a pressure in the main combustion chamber from a pressure in the pre-chamber when the air-fuel mixture is ignited before a top dead center of a compression stroke of the engine under a high load and high rotation operation condition of the engine is not less than a predetermined value, and the aperture ratio β is set so as to fall within a range from the lower limit aperture ratio βmin to the upper limit aperture ratio βmax, and, in the step of setting the volume V of the pre-chamber, the volume V is set based on the compression ratio ε and the aperture ratio β so that a maximum value RETmax of an energy transfer ratio from the pre-chamber to the main combustion chamber falls within a predetermined range under the high load and high rotation operation condition of the engine.

The setting of the aperture ratio β uses the dependence of the pressure difference between the main combustion chamber and the pre-chamber on the compression ratio ε and the aperture ratio β.

Since the upper limit aperture ratio βmax is set based on the compression ratio ε so that the pressure difference Δβmax between the main combustion chamber and the pre-chamber when the pressure in the pre-chamber is maximized under the medium load EGR operation condition is not less than the predetermined value, the desired jet potential for improving the thermal efficiency in the medium load operation can be advantageously obtained.

In addition, since the lower limit βmin of the aperture ratio β is set so that the pressure difference ΔPig between the main combustion chamber and the pre-chamber at the time of ignition is not less than the predetermined value under the high load and high rotation operation condition, the exchange of gas in the pre-chamber in the high load operation is advantageously ensured.

The setting of the volume V of the pre-chamber uses the dependence of RETmax on the compression ratio ε, the aperture ratio β, and the volume V.

Since the volume V of the pre-chamber is set based on the compression ratio ε and the aperture ratio β so that RETmax falls within the predetermined range after the aperture ratio β is set so as to fall within the range from the lower limit aperture ratio βmin to the upper limit aperture ratio βmax, the thermal efficiency can be improved in the medium load EGR operation and knocking can be suppressed in the high load and high rotation operation.

In an embodiment, in the step of setting the aperture ratio β, the upper limit aperture ratio βmax is determined so that the pressure difference Δβmax is not less than 0.02 MPa and the lower limit aperture ratio βmin is determined so that the pressure difference ΔPig is not less than −0.3 MPa.

This is more advantageous to ensure the desired jet potential in the medium load EGR operation and to exchange gas in the pre-chamber in the high load and high rotation operation.

In an embodiment, in the step of setting the volume V of the pre-chamber, the volume V is set based on the compression ratio ε and the aperture ratio β so that the maximum value RETmax is not less than 0.95 J/degree and not more than 1.6 J/degree.

This is more advantageous to improve the thermal efficiency in the medium load EGR operation and to suppress knocking in the high load and high rotation operation.

In an embodiment, an injector that injects fuel to form the air-fuel mixture is provided so as to inject the fuel into the main combustion chamber.

Advantage of the Invention

According to the present disclosure, the thermal efficiency can be improved in the medium load EGR operation and knocking can be suppressed in the high load and high rotation operation.

BRIEF DESCRIPTION OF THE DRAWINGS

FIGS. 2A and 2B are diagrams illustrating a pre-chamber plug.

MODES FOR CARRYING OUT THE INVENTION

An embodiment of the present disclosure will be described with reference to the drawings. The description of the preferred embodiment described below is only an example and is not intended to limit the present disclosure, application thereof, or use thereof.

<Structure of an Engine>

The embodiment relates to a reciprocal engine for driving a vehicle installed in the vehicle.

Figure 1:
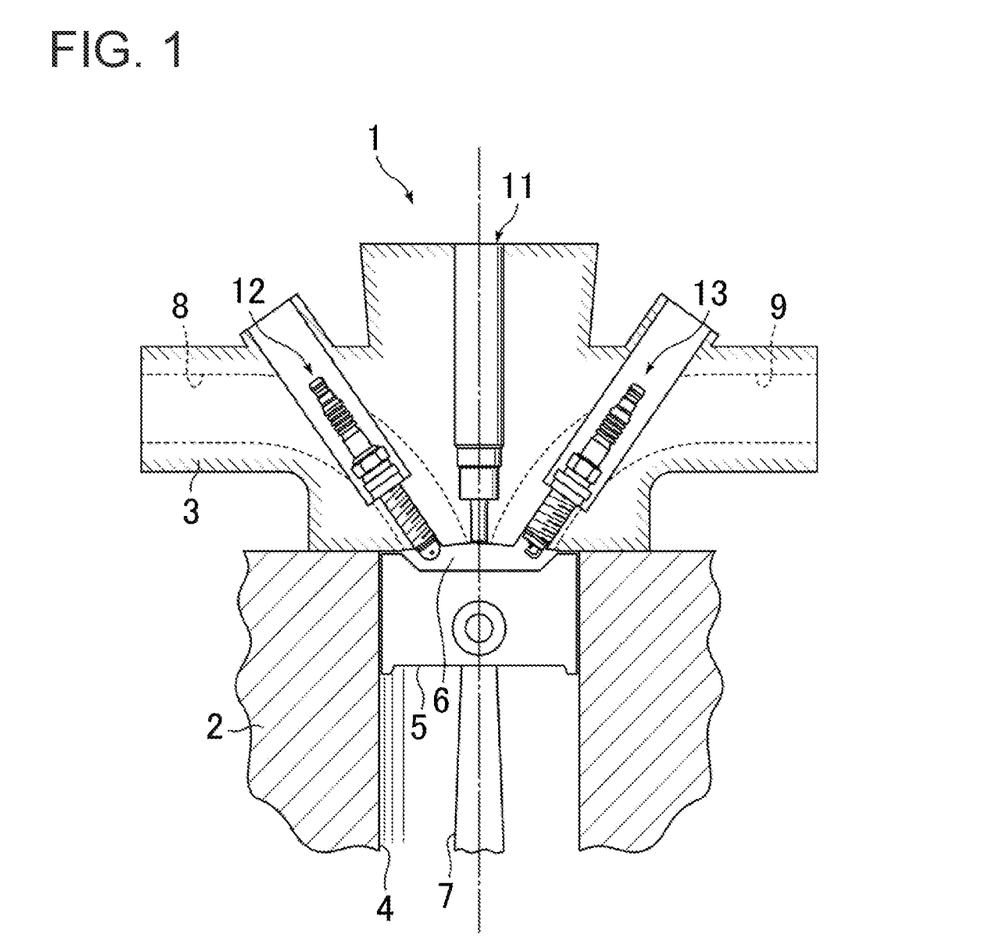
FIG. 1 is a structural diagram schematically illustrating an engine.

As illustrated in FIG. 1, an engine 1 includes a cylinder block 2 and a cylinder head 3. A cylinder 4 is formed in the cylinder block 2. A connecting rod 7 coupled to a crankshaft is connected to a piston 5 provided in the cylinder 4, so that the piston 5 reciprocates in the cylinder 4. A main combustion chamber 6 of the engine is formed by the cylinder block 2, the cylinder head 3, and the piston 5.

An intake port 8 and an exhaust port 9 are formed in the cylinder head 3. Although not illustrated, an intake valve and an exhaust valve are provided in the intake port 8 and the exhaust port 9, respectively, so as to open and block the openings close to the main combustion chamber 6.

Although not illustrated, an intake passage is connected to the intake port 8 and an exhaust passage is connected to the exhaust port 9. An exhaust gas recirculation (EGR) passage that circulates part of exhaust gas having passed through a three-way catalyst to the intake passage is connected to the exhaust passage. The EGR passage is provided with an EGR cooler and an EGR valve that controls the flow rate of exhaust gas flowing through the EGR passage.

An injector 11, which injects fuel into the main combustion chamber 6, a pre-chamber plug 12 with a pre-chamber described later, and a normal spark plug 13 without a pre-chamber are attached to the cylinder head 3. The injector 11 is provided on the cylinder axis so that the tip thereof faces the central portion of the main combustion chamber 6. The pre-chamber plug 12 and the normal spark plug 13 are disposed on both sides of the injector 11 so as to sandwich the injector 11.

The pre-chamber plug 12 is provided near the intake port 8 and extends diagonally downward from a portion near the intake port 8 so that the tip thereof faces the main combustion chamber 6. The normal spark plug 13 is provided near the exhaust port 9 and extends diagonally downward from a portion near the exhaust port 9 so that the tip thereof faces the main combustion chamber 6 as illustrated in FIG. 1. It should be noted that the pre-chamber plug 12 may be provided in a portion near the exhaust port 9 and the normal spark plug 13 may be provided in a portion near the intake port 8.

Figure 2A:
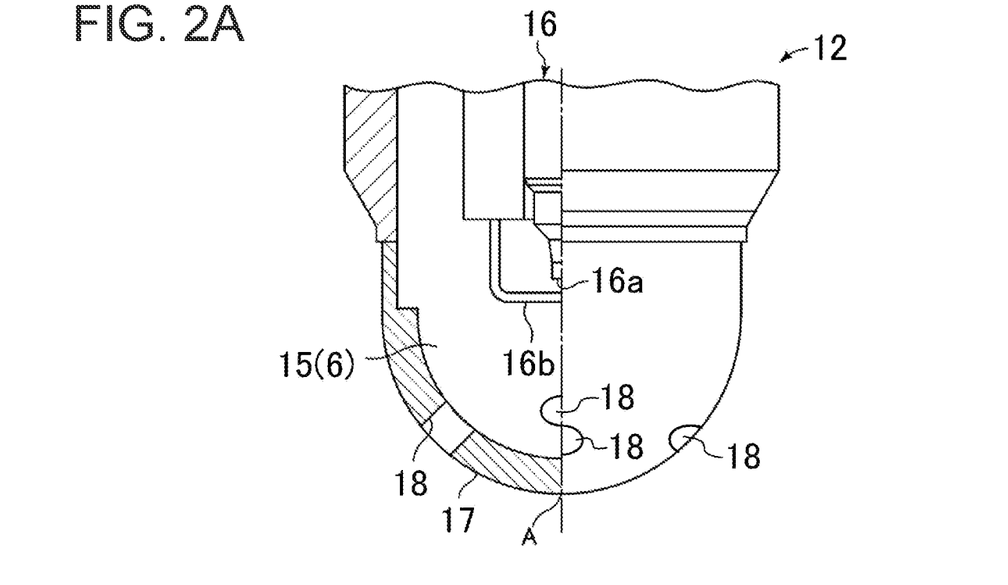
FIG. 2A is a side view in which a cross section is partially illustrated.

As illustrated in FIG. 2A, a pre-chamber 15 is formed at the tip of the pre-chamber plug 12, and a spark plug 16 is provided in the pre-chamber 15. The spark plug 16 has a center electrode 16a and a side electrode (ground) 16b as in the normal spark plug 13.

The pre-chamber 15 is provided in the main combustion chamber 6, but can burn an air-fuel mixture in the pre-chamber 15 independently of the main combustion chamber 6. More specifically, the pre-chamber 15 functions as a sub-combustion chamber that causes flame propagation within the pre-chamber 15 by igniting the air-fuel mixture therein with the spark plug 16.

Figure 2B:
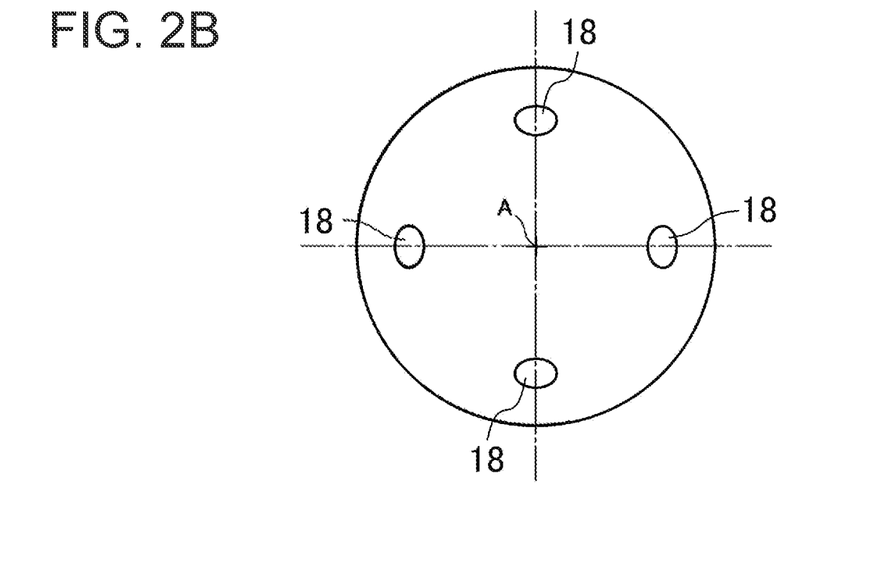
FIG. 2B is a diagram seen from below.

As illustrated in FIGS. 2A and 2B, the pre-chamber 15 is formed by a hemispherical pre-chamber forming portion 17 having a predetermined diameter and a predetermined thickness. A plurality of injection holes 18 communicating with the main combustion chamber 6 are formed in the pre-chamber forming portion 17.

These injection holes 18 are provided to cause the air-fuel mixture in the main combustion chamber 6 to flow into the pre-chamber 15, the flame generated in the pre-chamber 15 by ignition of the air-fuel mixture is injected and radiated into the main combustion chamber 6, so that the air-fuel mixture within the main combustion chamber 6 burns faster.

Basically, the air-fuel mixture includes fresh air through the intake port 8 and the fuel injected from the injector 11 when the EGR valve is closed, and the air-fuel mixture includes fresh air through the intake port 8, the exhaust gas through the EGR passage, and the fuel injected from the injector 11 when the EGR valve is open.

In the embodiment, these injection holes 18 are four injection holes 18 provided at 900 intervals about the axis passing through an apex A of a pre-chamber forming portion 64 in plan view seen from below illustrated in FIG. 2B, and the four injection holes 18 are formed so as to extend in the directions of 45° at the positions located 45° from the apex A of the hemispherical pre-chamber forming portion 17 as illustrated in FIG. 2A, thereby causing the flame to be ejected through the injection holes 18 at an angle of 45° with respect to the axis.

It should be noted that the number and the positions of the injection holes 18 are not limited to these values and, for example, five or six injection holes 18 may be provided at equal intervals about the axis passing through the apex Ain plan view seen from below, or less than four or not less than seven injection holes may be provided. In addition, the injection holes 18 may be straight holes extending in the directions of 45° or swirl holes extending while being inclined laterally with respect to the directions of 45°.

<Specifications of the Engine and the Pre-Chamber>

In the embodiment, a bore stroke ratio (S/B), which is the ratio of the piston stroke (stroke S) to the cylinder bore (inner diameter B), is preferably not less than 1 and not more than 1.5. The stroke volume is preferably not less than 500 cc and not more than 700 cc. A compression ratio ε is preferably not less than 14 and not more than 24, more preferably not less than 16 and not more than 18.

A volume V of the pre-chamber 15 is preferably not less than 0.12 cm$^3$ and not more than 0.328 cm$^3$, more preferably not less than 0.2 cm$^3$ and not more than 0.328 cm$^3$. An aperture ratio β (=St/V), which is the ratio of a total cross-sectional area St (sum of the cross-sectional areas of the injection holes 18) of the plurality of injection holes 18 to the volume V of the pre-chamber 15, is preferably not less than 0.0078 mm$^{-1}$ and not more than 0.0145 mm$^{-1}$, more preferably not less than 0.0078 mm$^{-1}$ and not more than 0.011 mm$^{-1}$.

<Manufacturing of the Engine>

The method of manufacturing the engine will be described.

Figure 3:
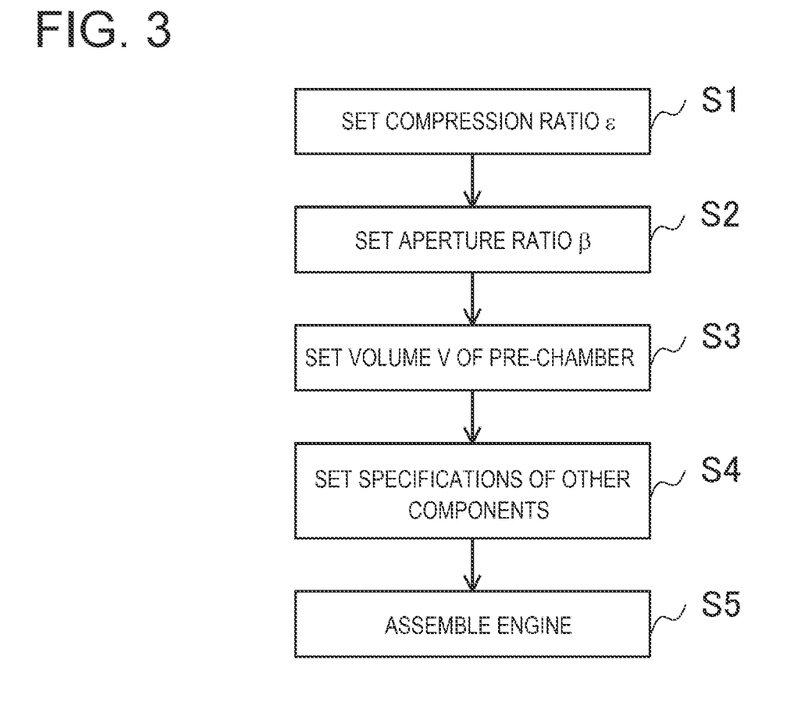
FIG. 3 is the process flow chart of a method of manufacturing the engine.

As illustrated in FIG. 3, in a first step S1, the compression ratio ε is set so as to fall within the range from 14 to 24. The compression ratio ε is set to, for example, 15 or 17 in terms of the thermal efficiency, the ignition timing, and the like.

In a second step S2, the upper limit βmax and the lower limit βmin of the aperture ratio β are determined based on the compression ratio ε determined in the first step S1 by using the dependence of the pressure difference between the main combustion chamber and the pre-chamber on the compression ratio ε and the aperture ratio β. The aperture ratio β is set so as to fall within the range from the lower limit βmin to the upper limit βmax.

In a third step S3, the volume V of the pre-chamber is set based on the compression ratio ε set in the first step S1 and the aperture ratio β set in the second step S2 by using the dependence of the jet potential on the compression ratio ε, the aperture ratio β, and the volume V of the pre-chamber.

In a fourth step S4, the specifications of the other engine components (engine stroke volume Vst, clearance volume, piston stroke S, bore diameter B, and the number and displacement of injection holes through which the main combustion chamber communicates with the pre-chamber) are set. Since the volume V of the pre-chamber and the aperture ratio β have been determined, if the number of the injection holes is determined, the diameter of the injection holes is determined by assuming the injection holes to be circular.

In a fifth step S5, the components constituting the engine are designed, manufactured, and assembled based on the specifications set in the second step S2 to the fourth step S4.

It should be noted that the specifications of the structural components that do not involve the compression ratio ε, the aperture ratio β, or the volume V of the pre-chamber can be set in advance concurrently with the first step S1 to the third step S3.

(About the Second Step S2 (Determination of βMax and βMin))

The upper limit aperture ratio βmax and the lower limit aperture ratio βmin are determined by assuming that a pressure difference ΔP between the main combustion chamber 6 and the pre-chamber 15 depends on the compression ratio ε and the aperture ratio β. The specific description will be given below.

Figure 4:
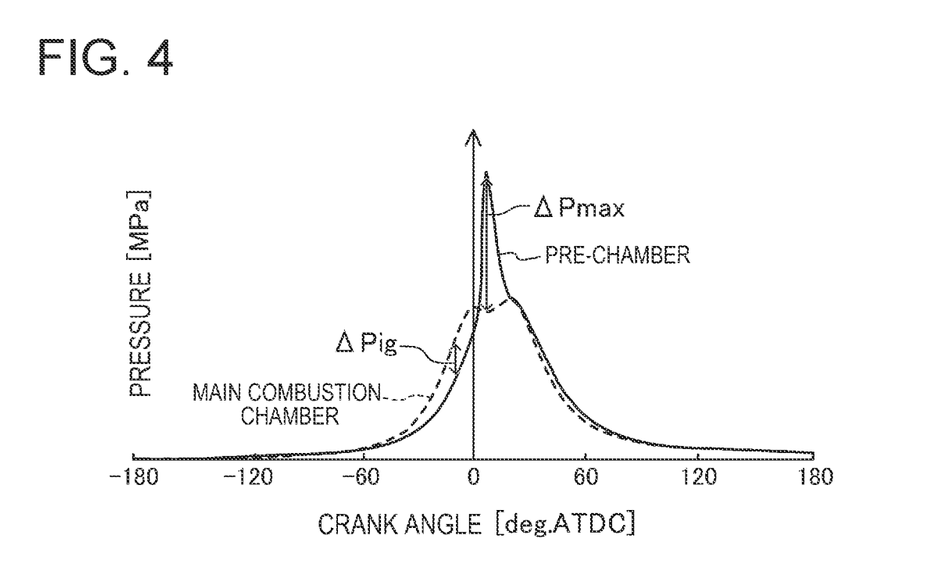
FIG. 4 is a graph illustrating changes in the pressure in a main combustion chamber and changes in the pressure in the pre-chamber in a compression stroke and an expansion stroke of the engine.

The upper limit aperture ratio βmax is determined based on the compression ratio ε so that the pressure difference ΔP between the main combustion chamber 6 and the pre-chamber 15 when the pressure in the pre-chamber 15 is maximized under the medium load and medium rotation EGR operation condition of the engine is not less than a predetermined value. In pre-chamber ignition, the pressures in the main combustion chamber 6 and the pre-chamber 15 basically change as illustrated in FIG. 4.

Regarding the pressure changes, since the injection holes 18 of the pre-chamber 15 become ventilation resistance in the compression stroke, the rise in the pressure in the pre-chamber 15 is slower than in the main combustion chamber 6. That is, the pressure in the pre-chamber 15 is lower than in the main combustion chamber 6. Then, the air-fuel mixture of the pre-chamber 15 is ignited by firing before the top dead center of the compression stroke, the pressure in the pre-chamber 15 rises sharply, and the pressure in the pre-chamber 15 is higher than the pressure in the main combustion chamber 6 after the top dead center of the compression stroke. The pressure difference between the main combustion chamber 6 and the pre-chamber 15 when the pressure in the pre-chamber 15 is maximized is Δβmax.

Since the pressure difference between the main combustion chamber 6 and the pre-chamber 15 becomes larger (the pressure in the main combustion chamber 6 becomes larger) as the compression ratio ε is larger because the injection holes 18 become the ventilation resistance as described above, Δβmax after ignition becomes smaller as the compression ratio ε is larger. On the other hand, for the aperture ratio β, since the pressure is easily released through the injection holes 18 during a pressure rise after ignition in the pre-chamber 15 when the aperture ratio β increases in medium load medium rotation operation, Δβmax becomes smaller as the aperture ratio β is larger.

That is, Δβmax depends on the compression ratio ε and the aperture ratio β. Accordingly, Δβmax can be expressed as follows by using function F1(ε) of the compression ratio s and function F1(β) of the aperture ratio β.

$$\Delta\beta max = F1(\varepsilon) \times F1(\beta) \quad (1)$$

$$F1(s) = -0.0062 \times \varepsilon + 0.1949 \quad (2)$$

$$F1(\beta) = 9.51 \times 10 - 5 \times \beta - 1.754 \quad (3)$$

Here, F1(ε) and F1(β) are derived by a parametric study using a 0-dimensional simulation tool. The tool prepares, in the main combustion chamber of the engine, a small room simulating the pre-chamber and calculates the pressures, temperatures, and densities of the main combustion chamber and the pre-chamber in consideration of energy exchange between the pre-chamber and the main combustion chamber, heat dissipation from the main combustion chamber and the pre-chamber, and the like.

In the calculation, the bore diameter B, the stroke S, the compression ratio ε, the volume V of the pre-chamber, the aperture ratio β, the injection hole diameter D, the number of engine revolutions, the fuel injection amount, the excess air rate, the EGR rate, the intake valve closing time, the exhaust valve opening time, the temperature and pressure at the intake valve closing time, the wall temperatures and the heat generation rates of the main combustion chamber and the pre-chamber are set as conditions. The fuel injection amount, the EGR rate, the heat generation rate, and the like are input by simulating the results of an actual single-cylinder engine.

Figure 5:
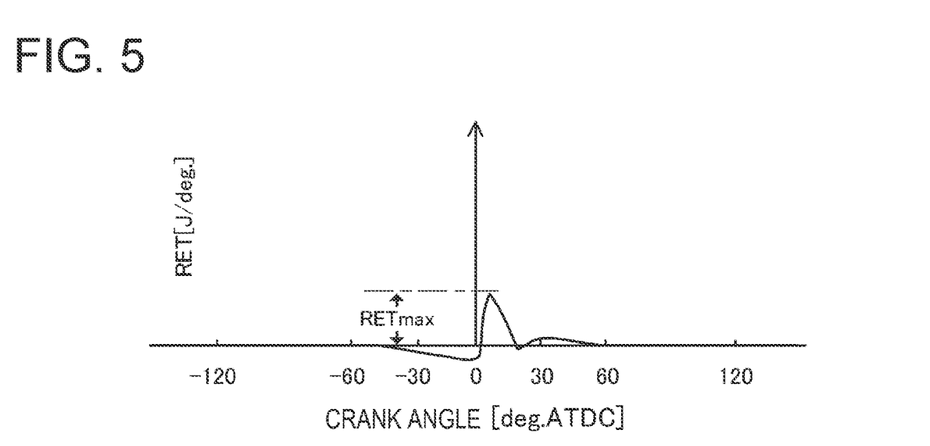
FIG. 5 is a graph illustrating changes in the energy transfer ratio from the pre-chamber to the main combustion chamber in the compression stroke and the expansion stroke of the engine.

FIGS. 4 and 5 illustrate examples of the results calculated under a predetermined medium load EGR operation condition. FIG. 4 illustrates the pressure changes in the main combustion chamber and the pre-chamber as described above and Δβmax and ΔPig are evaluation indexes. ΔPig is the pressure difference between the main combustion chamber and the pre-chamber at the time of ignition of the air-fuel mixture in the pre-chamber before the top dead center of the compression stroke of the engine, more specifically, at a position 100 before the top dead center of the compression stroke in the embodiment. FIG. 5 illustrates changes in the energy transfer ratio from the pre-chamber to the main combustion chamber and a maximum value RETmax of the energy transfer ratio is an evaluation index. In the following description, RETmax may be referred to as the jet potential.

The calculation described above is performed over hundreds of conditions, and the degree of influence of the compression ratio ε and the aperture ratio β on Δβmax is regressed from the calculation results to derive the equations of F1(ε) and F1(β) described above.

Figure 6:
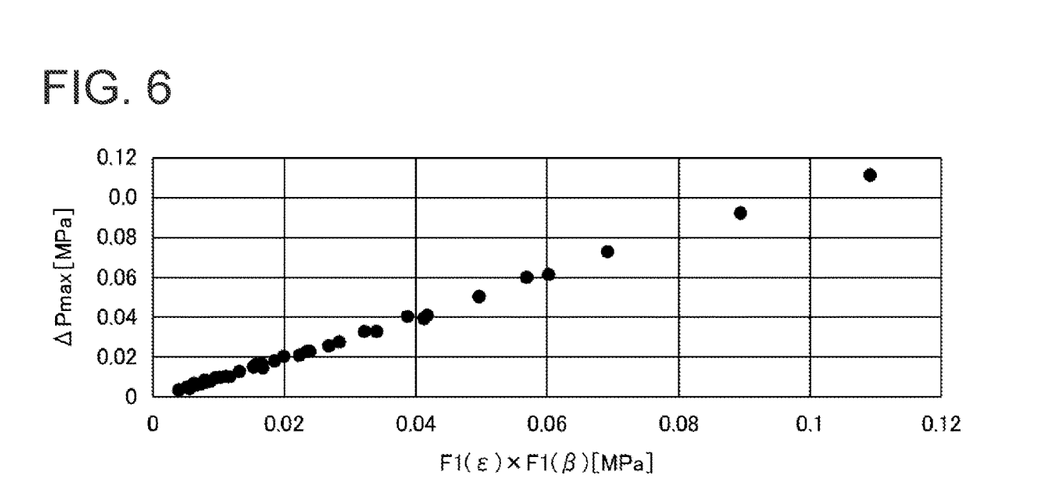
FIG. 6 is a graph illustrating the correlation between the calculation result of $\Delta\beta max$ and the calculation result of $F1(\epsilon) \times F1(\beta)$ in simulation.

FIG. 6 illustrates the correlation between the calculation result of Δβmax by the simulation tool and the calculation result of F1(ε)×F1(β) based on equations (1) to (3) shown above. It can be seen that the derived equations (2) and (3) are valid.

It has been confirmed in an experiment that the thermal efficiency of the engine becomes higher than the reference when Δβmax is not less than 0.02 MPa in the medium load EGR operation. Accordingly, the compression ratio ε set in the first step S1 is substituted into the equation (2) to obtain F1(ε), the value of F1(ε) is substituted into the equation (1) to obtain F1(β) when Δβmax is assumed to be 0.02 MPa, which is a predetermined value, and the upper limit aperture ratio βmax is obtained from the equation (3). For example, when the compression ratio ε is 17, the upper limit aperture ratio βmax is 0.011.

Next, the lower limit aperture ratio βmin will be described. The lower limit aperture ratio βmin is obtained based on the compression ratio ε set in the first step S1 so that the pressure difference ΔPig between the main combustion chamber and the pre-chamber is not more than the predetermined value in the high load and high rotation operation condition of the engine.

Since the injection holes 18 become ventilation resistance as described above, the pressure difference ΔPig between the main combustion chamber and the pre-chamber becomes larger as the compression ratio ε is larger and the pressure difference ΔPig becomes smaller as the aperture ratio β is larger. That is, ΔPig depends on the compression ratio ε and the aperture ratio β. Accordingly, ΔPig can be expressed as follows by using function F2(ε) of the compression ratio s and function F2(β) of the aperture ratio β.

$$\Delta Pig = F2(\varepsilon) \times F2(\beta) \quad (4)$$

$$F2(\varepsilon) = 0.1727 \times \exp(0.1309 \times \varepsilon) \quad (5)$$

$$F2(\beta) = -1.0408 \times 10^{-5} \times \beta^{-2.0994} \quad (6)$$

F2(ε) and F2(β) are derived by a parametric study that uses the 0-dimensional simulation tool described above, as in F1(ε) and F1(β) described above. That is, the degree of influence of the compression ratio ε and the aperture ratio β on Δβmax is regressed from the calculation results to derive the equations of F2(ε) and F2(β) described above.

Figure 7:
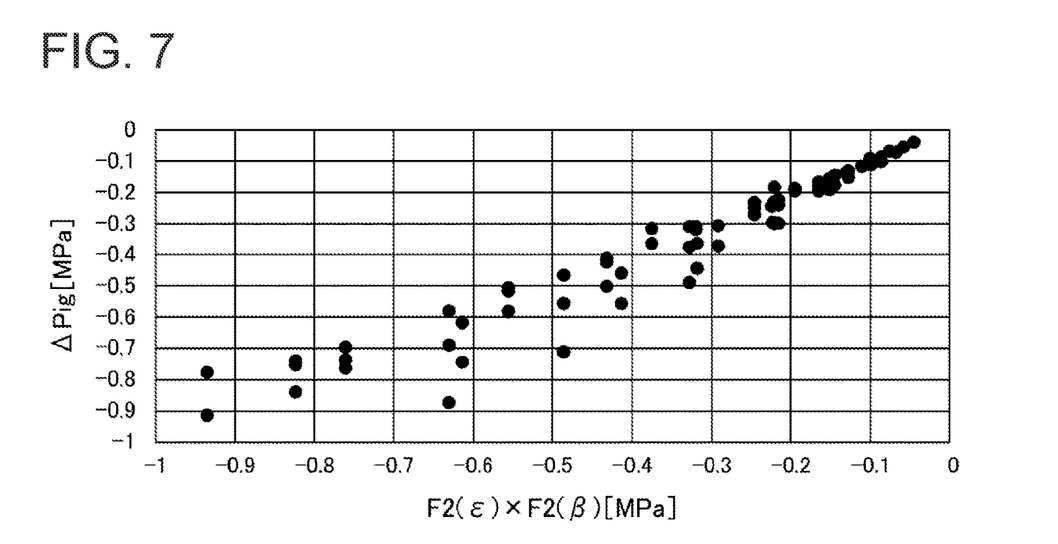
FIG. 7 is a graph illustrating the correlation between the calculation result of $\Delta Pig$ and the calculation result of $F2(\epsilon) \times F2(\beta)$ in simulation.

FIG. 7 illustrates the correlation between the calculation result of ΔPig by the simulation tool and the calculation result of F2(ε)×F2(β) based on the equations (4) to (6) shown above. It can be seen that the derived equations (5) and (6) are valid. It should be noted that ΔPig is a negative value in FIG. 7 because ΔPig is the value obtained by subtracting the pressure in the main combustion chamber from the pressure in the pre-chamber.

In the high load and high rotation operation, the transfer of gas from the main combustion chamber to the pre-chamber is important (ideally ΔPig=0). As a result of an experiment performed under several conditions in which the aperture ratio β varies, when ΔPig is not less than −0.3 MPa (the absolute value of the pressure difference is small), exchange of gas in the pre-chamber is ensured and good thermal efficiency can be obtained. Accordingly, the compression ratio ε set in the first step S1 is substituted into the equation (5) to obtain F2(ε), the value of F2(ε) is substituted into the equation (4) to obtain F2(β) when ΔPig is assumed to be −0.3 MPa, which is a predetermined value, and the lower limit aperture ratio βmin is obtained from the equation (6). For example, when the compression ratio ε=17, the lower limit aperture ratio βmax is 0.007.

(About the Third Step S3 (Determination of the Volume V of the Pre-Chamber))

The volume V of the pre-chamber is set based on the compression ratio ε set in the first step S1 and the aperture ratio β set in the second step S2 by using the dependence of the jet potential on the compression ratio ε, the aperture ratio β, and the volume V of the pre-chamber, as described above.

In the high load and high rotation operation condition of the engine, since the density of the air-fuel mixture in the pre-chamber becomes larger as the compression ratio ε is larger, the jet potential, that is, RETmax, which is the maximum value of the energy transfer ratio from the pre-chamber to the main combustion chamber, becomes larger. In addition, since the exchange of gas in the pre-chamber is better as the aperture ratio β is larger, RETmax becomes larger. In addition, since the amount of heat generated in the pre-chamber is larger as the volume V of the pre-chamber is larger, RETmax becomes larger. That is, RETmax depends on the compression ratio ε, the aperture ratio β, and the volume V of the pre-chamber. Accordingly, RETmax can be expressed as follows by using function F3(ε) of the compression ratio ε, the function F3(β) of the aperture ratio β, and function F3(V) of the volume V of the pre-chamber.

$$RET\max = F3(\varepsilon) \times F3(\beta) \times F3(V) \quad (7)$$

$$F3(\varepsilon) = 0.9698 \times \ln(\varepsilon) - 1.5623 \quad (8)$$

$$F3(\beta) = 0.8494 \times \ln(\beta) + 5.1483 \quad (9)$$

$$F3(V) = 0.3600 \times \exp(2.6080 \times V) \quad (10)$$

F3(ε), F3(β), and F3(V) are derived by a parametric study using the 0-dimensional simulation tool described above, as in F1(ε) and F1(β) described above. That is, the degree of influence of the compression ratio ε, the aperture ratio β, and the volume V of the pre-chamber on RETmax is regressed from the calculation results to derive the equations of F3(ε), F3(β), and F3(V) described above.

Figure 8:
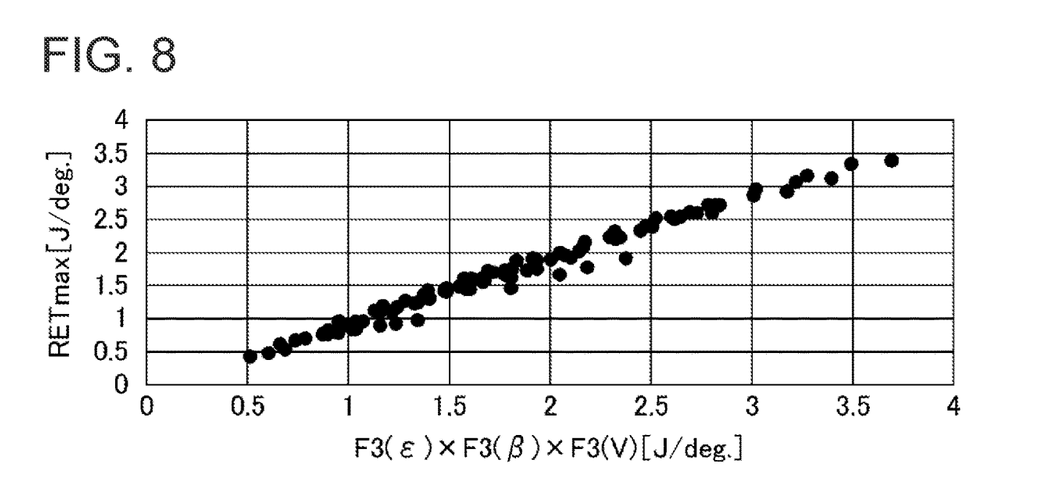
FIG. 8 is a drawing illustrating the correlation between the calculation result of RETmax and the calculation result of $F3(\epsilon) \times F3(\beta) \times F3(V)$ in simulation.

FIG. 8 illustrates the correlation between the calculation result of RETmax by the simulation tool and the calculation result of F3(ε)×F3(β)×F3(V) based on the equations (7) to (10) shown above. It can be seen that the derived equations (8) to (10) are valid.

Accordingly, when the requirement of RETmax as the engine performance is determined, the volume V of the pre-chamber for this requirement can be obtained from the equations (7) to (10) shown above. Here, when RETmax is assumed to be a constant as RETmax=a, the volume V of the pre-chamber can be expressed as follows from the equations (7) to (10) shown above.

$$V=(1/2.6080)\times \ln(A) \quad (11)$$

$$A=a/(0.3600\times(0.9698\times \ln(\varepsilon)-1.5623)\times(0.8494\times \ln(\beta)+5.1483)) \quad (12)$$

That is, the compression ratio ε set in the first step S1, the aperture ratio β set in the second step S2, and value "a" as RETmax are substituted into the equation (12) to obtain A, and the volume V of the pre-chamber is obtained from the equation (11). According to the equations (11) and (12), the volume V of the pre-chamber becomes smaller as the compression ratio ε is larger, the volume V of the pre-chamber becomes smaller as the aperture ratio β is larger, and the volume V of the pre-chamber becomes larger as constant "a" is larger.

(About the Requirement of RETmax)

Figure 9:
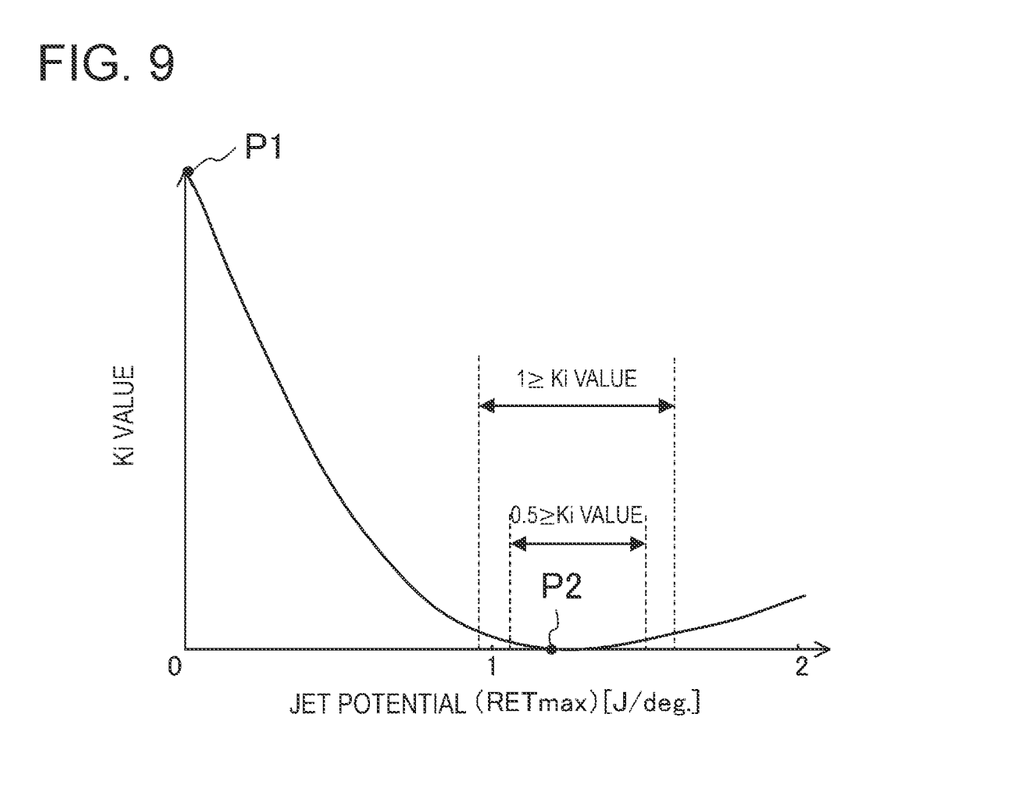
FIG. 9 is a graph illustrating the relationship between RETmax and knock index Ki.

Suppression of knocking (strong knock) is important in the high load and high rotation operation of the engine with a high compression ratio ε. It has been found, from an experiment performed under several conditions with RETmax varying, that knocking can be suppressed when RETmax falls within a predetermined range. FIG. 9 illustrates the relationship between RETmax at 6,000 rpm WOT (wide open throttle) obtained in an experiment and a knocking index (knock strength) Ki. The compression ratio ε of the engine is 17. In the experiment, RETmax varies when the diameter of the injection holes and the volume V of the pre-chamber change.

The Ki value is calculated based on the vibration data of pressure waves generated in the cylinder. The vibration data is detected by a knock sensor, an in-cylinder pressure sensor, or the like. Here, the Ki value indicates the average value of the strengths of knocks generated in 300 combustion cycles. Accordingly, when strong knocks occur in the sampling period, the Ki value increases according to the intensity and frequency thereof.

As illustrated in FIG. 9, an inflection point was observed in the Ki value when RETmax changes from 0 to 2. Specifically, the Ki value is minimized when RETmax is approximately 1.2 J/degree. It is recognized that steep heat generation accompanied by strong columnar vibration occurs when RETmax is large, and the Ki value becomes large. It is also recognized that flame propagation in the main combustion chamber becomes slower when RETmax is small, so self-ignition of end gas is induced and the Ki value becomes large.

Figure 10:
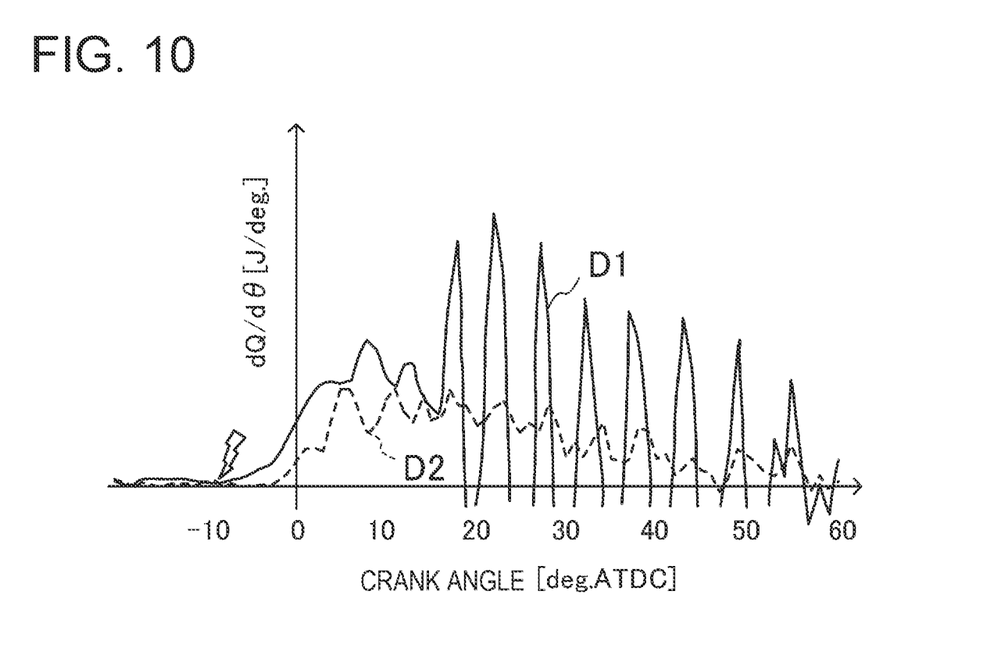
FIG. 10 is a graph illustrating changes in the heat generation rate of the engine.

FIG. 10 illustrates examples of vibration data D1 and D2 at points P1 and P2 in the graph illustrated in FIG. 9. The solid line in the graph represents the vibration data D1 at point P1 at which RETmax is 0 (zero) J/degree. The dashed line in the graph represents the vibration data D2 at point P2 at which RETmax is 1.2 J/degree. The vertical axis represents the heat generation rate and the horizontal axis represents the crank angle.

The vibration data D1 represents the test result of the engine that ignites the air-fuel mixture by using the normal spark plug without the pre-chamber. The vibration data D2 represents the test result of the engine that ignites the air-fuel mixture in the pre-chamber having four injection holes with a diameter of 1.0 mm and a volume V of 0.31 cc. The ignition timing is immediately before the top dead center (−10° ATDC).

The vibration data D1 shows the occurrence of large pressure fluctuations, that is, strong knocks, during a predetermined time period after ignition. In contrast, unlike the vibration data D1, the vibration data D2 does not show large pressure fluctuations. It can be seen that strong knocks are suppressed in the vibration data D2.

Based on the data accumulated so far, the range of the Ki value that is practically preferable is not more than 1, including measurement error. More preferably, the range is not more than 0.5. FIG. 9 illustrates the range in which the Ki value is not more than 1 and the range in which the Ki value is not more than 0.5.

The range in which the Ki value is not more than 1 corresponds to the range in which RETmax is not less than 0.95 J/degree and not more than 1.6 J/degree ("a" in the equation (12) is not less than 0.95 and not more than 1.65). The range in which the Ki value is not more than 0.5 corresponds to the range in which RETmax is not less than 1.05 and not more than 1.5 ("a" in the equation (12) is not less than 1.05 and not more than 1.5).

According to the manufacturing method described above, the upper limit βmax of the aperture ratio β is set so that Δβmax is not less than the predetermined value (0.02 MPa at which the thermal efficiency of the engine is higher than a reference value) in the medium load EGR operation condition, the lower limit βmin of the aperture ratio β is set so that ΔPig is not less than a predetermined value (−0.3 MPa at which gas in the pre-chamber is easily performed) in the high load and high rotation operation condition, and the aperture ratio β is set so as to fall within the range from the lower limit βmin to the upper limit βmax. Accordingly, desired thermal efficiency can be ensured in the medium load EGR operation and the high load and high rotation operation.

Then, the volume V of the sub-chamber is set so that the RETmax in the high load and high rotation operation condition falls within a predetermined range, which is not less than 0.95 J/degree and not more than 1.6 J/degree ("a" in the equation (12) is not less than 0.95 and not more than 1.65), so the occurrence of knocking can be suppressed in the high load and high rotation operation.

That is, according to the manufacturing method described above, the thermal efficiency can be improved in the medium load EGR operation and knocking can be suppressed in the high load and high rotation operation regardless of the stroke volume of the engine.

Here, for the aperture ratio β, when Δβmax=0.02 MPa and ΔPig=−0.3 MPa, then the upper limit aperture ratio βmax if the compression ratio ε=14 is 0.0133 mm$^{-1}$ and the lower limit aperture ratio βmin if the compression ratio ε=14 is 0.0078 mm$^{-1}$.

When Δβmax=0.02 MPa and ΔPig=−0.3 MPa, then the upper limit aperture ratio βmax if the compression ratio ε=24 is 0.0083 mm$^{-1}$ and the lower limit aperture ratio βmin if the compression ratio ε=24 is 0.0145 mm$^{-1}$.

That is, the aperture ratio β when the compression ratio ε is not less than 14 and not more than 24 is not less than 0.0078 mm$^{-1}$ and not more than 0.0145 mm$^{-1}$.

Here, when the compression ratio ε is 24, the lower limit aperture ratio βmin (0.0145 mm$^{-1}$)>the upper limit aperture ratio βmax (0.0083 mm$^{-1}$) is satisfied. As described above, depending on the compression ratio, the lower limit aperture ratio βmin may be more than the upper limit aperture ratio βmax (high compression ratio side). In this case, it is preferable to give priority to the lower limit aperture ratio βmin, that is, give priority to the suppression of excessive throttling in the high revolution range of the engine. This is because a high compression ratio engine can compensate for the weak portion in the jet blast by using other means (for example, self-ignition combustion) even if the jet blast of flame from the pre-chamber is weak (even if Δβmax<0.02) since the temperature of the main combustion chamber is high.

With the object of ensuring a desired thermal efficiency in the medium load EGR operation and in the high load and high rotation operation, the aperture ratio β when the compression ratio ε is not less than 14 and not more than 24 is preferably not less than 0.0078 mm$^{-1}$ and not more than 0.0145 mm$^{-1}$, more preferably not less than 0.0078 mm$^{-1}$ and not more than 0.011 mm$^{-1}$.

In addition, for the volume V of the pre-chamber, when RETmax=0.95 J/degree, then V=0.0430 cm$^3$ is satisfied if the compression ratio ε=24 and the aperture ratio β=0.0145$^{-1}$, V=0.2045 cm$^3$ is satisfied if the compression ratio ε=14 and the aperture ratio β=0.0145$^{-1}$, V=0.2018 cm$^3$ is satisfied if the compression ratio ε=24 and the aperture ratio β=0.0078$^{-1}$, and V=0.3635 cm$^3$ is satisfied if the compression ratio ε=14 and the aperture ratio β=0.0078$^{-1}$.

When RETmax=1.6 J/degree, then V=0.2428 cm$^3$ is satisfied if the compression ratio ε=24 and the aperture ratio β=0.0145$^{-1}$, V=0.4045 cm$^3$ is satisfied if the compression ratio ε=14 and the aperture ratio β=0.0145$^{-1}$, V=0.4017 cm$^3$ is satisfied if the compression ratio ε=24 and the aperture ratio β=0.0078$^{-1}$, and V=0.5631 cm$^3$ is satisfied if the compression ratio ε=14 and the aperture ratio β=0.0078$^{-1}$.

As described above, the volume V of the pre-chamber ranges from 0.0430 cm$^3$ to 0.5631 cm$^3$. With the object of suppressing the occurrence of knocking in the high load and high rotation operation, the volume V of the pre-chamber is preferably not less than 0.12 cm$^3$ and not more than 0.328 cm$^3$, more preferably not less than 0.2 cm$^3$ and not more than 0.328 cm$^3$.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1: engine
2: cylinder block
3: cylinder head
4: cylinder
5: piston
6: main combustion chamber
8: intake port
9: exhaust port
11: injector
12: pre-chamber plug
13: normal spark plug
15: pre-chamber
16: spark plug
16a: center electrode
16b: side electrode
17: pre-chamber forming portion
18: injection hole

The invention claimed is:

1. An engine comprising:
a main combustion chamber including a cylinder block, a cylinder head, and a piston;
a pre-chamber having a plurality of injection holes that open into the main combustion chamber; and
a spark plug that ignites an air-fuel mixture in the pre-chamber,
wherein a compression ratio ε of the main combustion chamber is not less than 14 and not more than 24,
an aperture ratio β is not less than 0.0078 mm$^{-1}$ and not more than 0.0145 mm$^{-1}$, where the aperture ratio β is a ratio of a total cross-sectional area St of the plurality of injection holes to a volume V of the pre-chamber, and
the volume V of the pre-chamber is not less than 0.12 cm$^3$ and not more than 0.328 cm$^3$.

2. The engine according to claim 1,
wherein the compression ratio ε is not less than 16 and not more than 18.

3. The engine according to claim 1,
wherein the volume V of the pre-chamber is not less than 0.2 cm$^3$ and not more than 0.328 cm$^3$.

4. The engine according to claim 1,
wherein the aperture ratio β is not less than 0.0078 mm$^{-1}$ and not more than 0.011 mm$^{-1}$.

5. The engine according to claim 1,
wherein an injector that injects fuel to form the air-fuel mixture is provided so as to inject the fuel into the main combustion chamber.

6. The engine according to claim 2,
wherein the volume V of the pre-chamber is not less than 0.2 cm$^3$ and not more than 0.328 cm$^3$.

7. The engine according to claim 2,
wherein the aperture ratio β is not less than 0.0078 mm$^{-1}$ and not more than 0.011 mm$^{-1}$.

8. The engine according to claim 2,
wherein an injector that injects fuel to form the air-fuel mixture is provided so as to inject the fuel into the main combustion chamber.

9. The engine according to claim 6,
wherein the aperture ratio β is not less than 0.0078 mm$^{-1}$ and not more than 0.011 mm$^{-1}$.

10. The engine according to claim 6,
wherein an injector that injects fuel to form the air-fuel mixture is provided so as to inject the fuel into the main combustion chamber.

11. The engine according to claim 9,
wherein an injector that injects fuel to form the air-fuel mixture is provided so as to inject the fuel into the main combustion chamber.

12. An engine comprising:
a main combustion chamber including a cylinder block, a cylinder head, and a piston;
a pre-chamber having a plurality of injection holes that open into the main combustion chamber; and
a spark plug that ignites an air-fuel mixture in the pre-chamber,
wherein a compression ratio ε of the main combustion chamber is not less than 14 and not more than 24,
an aperture ratio β is not less than 0.0078 mm$^{-1}$ and not more than 0.0145 mm$^{-1}$, where the aperture ratio β is a ratio of a total cross-sectional area St of the plurality of injection holes to a volume V of the pre-chamber, and the volume V of the pre-chamber is expressed by the following equation using the compression ratio ε and the aperture ratio β:

$$V=(1/2.6080)\times\ln(A)$$

where "A" is a/(0.3600×(0.9698×ln(ε)−1.5623)×(0.8494× ln(β)+5.1483)) and "a" is not less than 0.95 and not more than 1.6.

13. The engine according to claim 12,
wherein an injector that injects fuel to form the air-fuel mixture is provided so as to inject the fuel into the main combustion chamber.

14. A method of manufacturing an engine including a main combustion chamber including a cylinder block, a cylinder head, and a piston, a pre-chamber having a plurality of injection holes that open into the main combustion chamber, and a spark plug that ignites an air-fuel mixture in the pre-chamber, the method comprising:
  a step of setting a compression ratio ε of the main combustion chamber;
  a step of setting an aperture ratio β that is a ratio of a total cross-sectional area St of the plurality of injection holes to a volume V of the pre-chamber; and
  a step of setting the volume V of the pre-chamber,
  wherein, in the step of setting the aperture ratio β, an upper limit aperture ratio βmax is determined based on the compression ratio ε so that a pressure difference Δβmax obtained by subtracting a pressure in the main combustion chamber from a pressure in the pre-chamber when the pressure in the pre-chamber is maximized under a medium load exhaust gas recirculation (EGR) operation condition of the engine is not less than a predetermined value, a lower limit aperture ratio βmin is determined based on the compression ratio ε so that a pressure difference ΔPig obtained by subtracting a pressure in the main combustion chamber from a pressure in the pre-chamber when the air-fuel mixture is ignited before a top dead center of a compression stroke of the engine under a high load and high rotation operation condition of the engine is not less than a predetermined value, and the aperture ratio β is set so as to fall within a range from the lower limit aperture ratio βmin to the upper limit aperture ratio βmax, and
  in the step of setting the volume V of the pre-chamber, the volume V is set based on the compression ratio ε and the aperture ratio β so that a maximum value RETmax of an energy transfer ratio from the pre-chamber to the main combustion chamber falls within a predetermined range under the high load and high rotation operation condition of the engine.

15. The method of manufacturing the engine according to claim 14,
wherein, in the step of setting the aperture ratio β, the upper limit aperture ratio βmax is determined so that the pressure difference Δβmax is not less than 0.02 MPa and the lower limit aperture ratio βmin is determined so that the pressure difference ΔPig is not less than −0.3 MPa.

16. The method of manufacturing the engine according to claim 14,
wherein in the step of setting the volume V of the pre-chamber, the volume V is set based on the compression ratio ε and the aperture ratio β so that the maximum value RETmax is not less than 0.95 J/degree and not more than 1.6 J/degree.

17. The method of manufacturing the engine according to claim 14,
wherein an injector that injects fuel to form the air-fuel mixture is provided so as to inject the fuel into the main combustion chamber.

18. The method of manufacturing the engine according to claim 15,
wherein in the step of setting the volume V of the pre-chamber, the volume V is set based on the compression ratio ε and the aperture ratio β so that the maximum value RETmax is not less than 0.95 J/degree and not more than 1.6 J/degree.

19. The method of manufacturing the engine according to claim 15,
wherein an injector that injects fuel to form the air-fuel mixture is provided so as to inject the fuel into the main combustion chamber.

20. The method of manufacturing the engine according to claim 18,
wherein an injector that injects fuel to form the air-fuel mixture is provided so as to inject the fuel into the main combustion chamber.

\* \* \* \* \*